FTR-100 XR 4,117,404

EXTRA

United States Patent [19]

Marshall

[11] 4,117,404

[45] Sep. 26, 1978

[54] SYSTEM OF COMMUNICATIONS TO ALERT POLICE PERSONNEL OF TROUBLE ON EXPRESSWAYS

[75] Inventor: Arthur N. Marshall, Richmond, Va.

[73] Assignee: Traffic Safety Systems, Inc., Richmond, Va.

[21] Appl. No.: 599,118

[22] Filed: Jul. 25, 1975

Related U.S. Application Data

[63] Continuation of Ser. No. 286,087, Sep. 5, 1972, abandoned.

[51] Int. Cl.² ........................................ H04B 7/26

[52] U.S. Cl. ........................................ 325/1; 325/53; 325/55; 325/64; 340/32

[58] Field of Search ........................ 325/16, 51, 53, 55, 325/64, 111, 112, 117, 118, 312, 1; 340/31-33, 416, 224

[56] References Cited

U.S. PATENT DOCUMENTS

| | | | |
|---|---|---|---|
| 3,721,955 | 3/1973 | Schiff et al. | 340/33 |

OTHER PUBLICATIONS

Vehicular Location & Information Systems—William V. Braun and Donald J. Walker, Feb. 1970, pp. 136–143 of IEEE Trans. on Vehicular Technology, vol. VT-19, No. 1.

*Primary Examiner*—Robert L. Griffin
*Assistant Examiner*—Marc E. Bookbinder
*Attorney, Agent, or Firm*—Henry W. Foulds, Jr.

[57] ABSTRACT

A system involving transmitters adapted for mounting on trucks, buses, etc. and capable of energizing at least one transceiver along a highway which in turn sends a signal to a police control station to enable truck drivers to report a disabled vehicle and its general location; vandalism being avoided by mounting the transceivers on the top of light poles on expressways.

3 Claims, 1 Drawing Figure

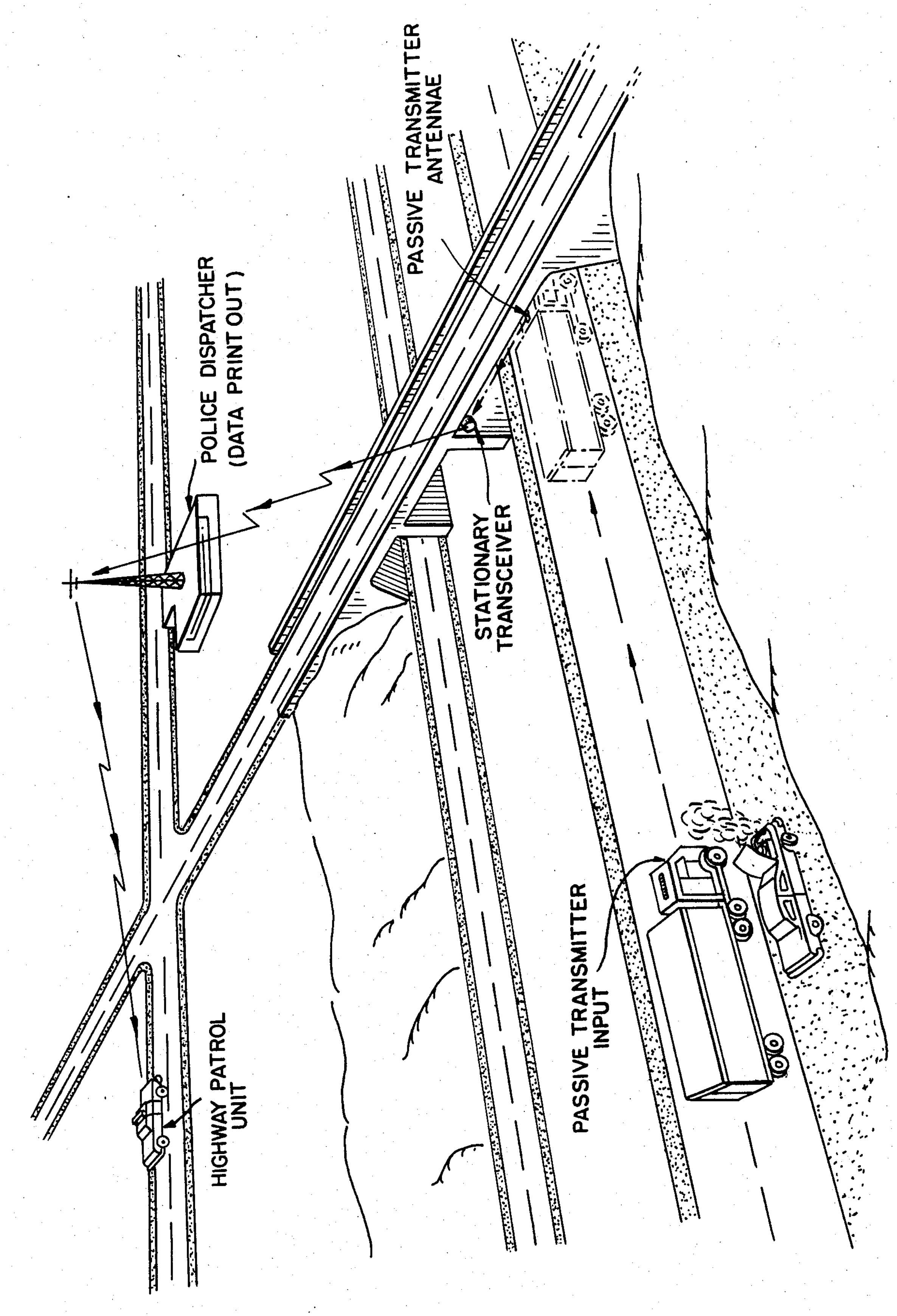
POLICE DISPATCHER
(DATA PRINT OUT)
PASSIVE TRANSMITTER
ANTENNAE
STATIONARY
TRANSCEIVER
PASSIVE TRANSMITTER
INPUT
HIGHWAY PATROL
UNIT

SYSTEM OF COMMUNICATIONS TO ALERT POLICE PERSONNEL OF TROUBLE ON EXPRESSWAYS

This application is a continuation of application Ser. No. 286,087 filed 09/05/72 by inventor Arthur N. Marshall now abandoned.

BACKGROUND

People involved with highway traffic problems in this nation have long been concerned with the lack of communications on our expressways. Accidents and breakdowns present a special problem because of the limited exits and the lack of access to means of communication.

Many attempts have been made to solve this problem, including a phone system along the expressway and radio communications.

The short-comings with the phone system have been:

1. The cost of the system ($4,000 a mile capitalized cost plus $600 a year maintenance).
2. Vandalism
3. False alarms
4. Accidents caused by people stopping along the expressway to use the phone
5. Necessity to walk along expressway The short-comings of the radio communications have been:

1. The crowded radio spectrum
2. The powerful signal necessary to implement
3. The constant transmission on Citizens Band with powerful transmitters
4. The lack of sufficient mobile radio transmitter units available on the expressways Other systems such as electronic signalling through headlight beam flicking have met with so many false alarms they have been unworkable.

The following proposed system will hopefully cure, to a reasonable degree, all of the above described disadvantages.

Suitable systems, typical of those old in the art, suitable for utilization in performing applicant's method are: U.S. Pat. No. 3,631,484 Augenblick of 12/28/71; U.S. Pat. No. 3,747,068 Bruenr of 7/17/73; and U.S. Pat. No. 3,754,250 Bruner of 8/21/73. These patents disclose transceivers which receive from a unit predetermined set-up condition identifying information.

This system is composed of a series of transceivers spaced along the median or adjacent to the expressway. These transceivers will receive a coded message on one band, e.g., Citizens Band, and transmit on another band, e.g., Police Band. They will either be placed at regular intervals, e.g., every 10 miles, or at the proximity of each intersection of the expressway. Each transceiver will have two receiving antennas that are directional so that it can identify the direction of the trouble.

In addition to the transceivers, the system will utilize a large number of transmitters that will transmit, possibly on Citizens Band, a weak, coded signal of under 200 milliwatts. These transmitters will be designed to be installed in truck cabs, buses, and certain automobiles.

The simplest form of these transmitters would transmit a coded signal from the truck, etc. when the operator pushed a button. There would be probably a plurality of buttons, e.g., one button for accident and a second button for breakdown. In a less simple form, the transmitter would allow the truck driver to talk into a microphone after he had transmitted a coded signal that would activate the transceiver installed along the highway. To prevent vandalism, the transceiver would be mounted out of reach of the public, e.g., on a utility pole. The operator beeps at the stranded motorist a couple of times to signal him that he is going to send for help. If desirable the buttons on the transmitter could also activate an audible signal to the motorist.

To effectuate this system the above mentioned transmitters would be placed in a large number of trucks and buses that frequent the expressways. A number of truck companies have scheduled routes as do bus companies. The system would operate by the vehicle operator pushing the appropriate button when he observed an accident or breakdown. The transmitter would send out a coded signal periodically for a predetermined length of time, e.g., 12 minutes, so that the signalling operator will presumably have time to pass one of the transceivers. The coded signal that the operator sends will signal the transceiver to transmit, will identify whether it is a breakdown or an accident, and could identify the transmitter from which the signal came. The transceiver would transmit the message on Police Band to a police station and the dispatcher will transmit the message to the duty patrol officer or other appropriate personnel.

The transceiver would add to the code it transmits a code of its own which will locate the transceiver's position. Because the transceiver has two directional receiving antennas, each with a different code, it will allow the dispatcher to determine whether the trouble is up or downstream from that particular transceiver.

The coded message would be received at the police control station by a de-coder.

The drawing is illustrative of one form of the means for carrying, out applicant's invention.

The system proposed here would cost approximately $500 a mile (capitalized cost) and would not have any of the disadvantages that have been previously listed.

I claim:

1. A method of notifying a control station for summoning assistance to motorists or vehicles in distress on a highway by an occupant of an approved vehicle, the steps of:
   - moving the approved vehicle along said highway having predeterminedly spaced transceivers therealong;
   - actuating a unit on said approved vehicle by an occupant of the approved vehicle when a motorist or vehicle in distress is observed by said occupant to transmit a signaling condition of said unit indicative of the distress situation and of the approved vehicle identification which continues for a predetermined period of time sufficient for said vehicle to pass a said transceiver based on the distance between said transceivers;
   - signaling by said occupant to the distressed motorist on passing that help is being sent for;
   - continuing movement of the approved vehicle along said highway until said approved vehicle passes a said transceiver;
   - receiving said transmitted signaling condition at the said transceiver when said approved vehicle is in range of said transceiver;
   - responding by the said transceiver automatically to said signaling condition of said unit; and
   - transmitting by said passed transceiver said signaling condition and the passed transceiver's location automatically to the control station for further handling to bring assistance to the motorist in distress.

2. A method as defined in claim 1 and wherein said unit which is actuated to produce said signaling condition is a transmitter which sends out a coded signal which continues for a predetermined period of time.

3. A method as defined in claim 1 and wherein said transmitting by said transceiver includes an identification of the up or down stream direction of the trouble from the transceiver requiring assistance.

* * * * *